(No Model.)

K. HUBER.
SOAP RECEPTACLE.

No. 404,354.  Patented May 28, 1889.

Witnesses:
C. H. Kuney,
Anna Faust

Inventor:
Katie Huber
By Erwin A. Benedict
Attorneys

UNITED STATES PATENT OFFICE.

KATIE HUBER, OF MILWAUKEE, WISCONSIN, ASSIGNOR OF ONE-HALF TO CHARLOTTE POWELL, OF SAME PLACE.

SOAP-RECEPTACLE.

SPECIFICATION forming part of Letters Patent No. 404,354, dated May 28, 1889.

Application filed December 3, 1888. Serial No. 292,526. (No model.)

*To all whom it may concern:*

Be it known that I, KATIE HUBER, of Milwaukee, in the county of Milwaukee and State of Wisconsin, have invented a new and useful Soap-Receptacle; and I do hereby declare the following to be a full, clear, and exact description of said invention, reference being had to the accompanying drawings, and to the letters or figures of reference marked thereon, which form part of this specification.

The object of my invention is to provide a device especially adapted for kitchen and laundry use, the practical use of the device being to hold a cake or bar of soap for common use, and also for receiving in a chamber small pieces or odds and ends of soap, in which chamber these pieces of soap may be retained, and on occasion drenched with water and reduced to a solution or suds, as required, the device being provided with additional parts for its convenient use, to be hereinafter described.

Figure 1:
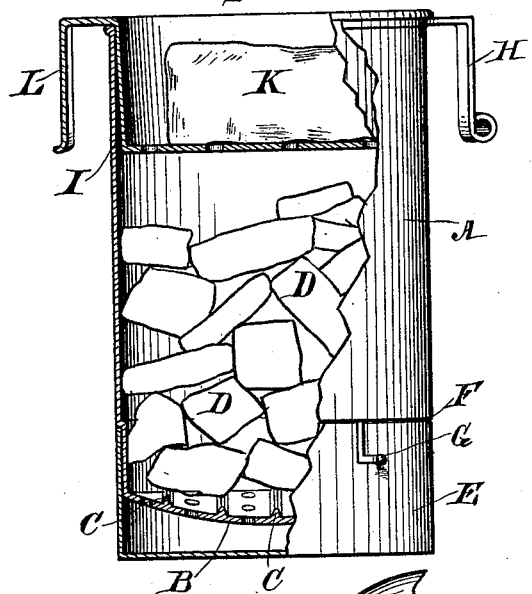
Figure 2:
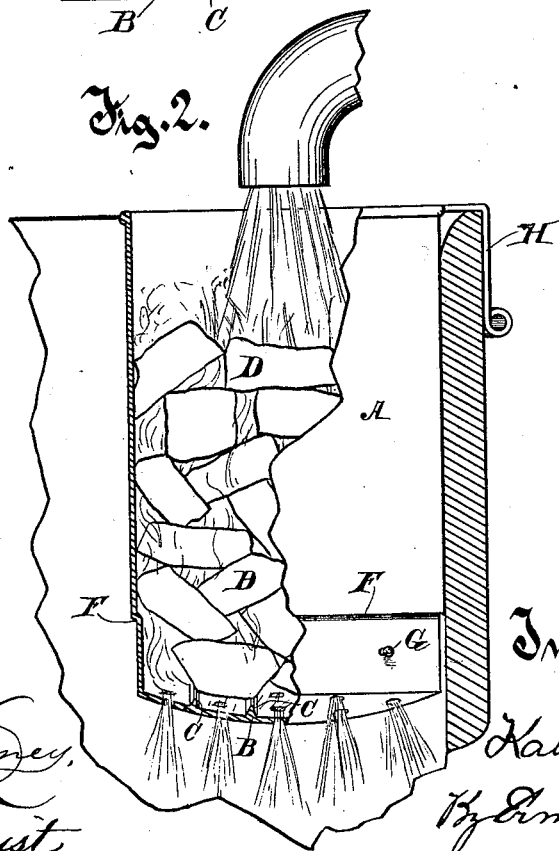

In the drawings, Figure 1 is an elevation of the complete device, parts being broken away to show the interior construction. Fig. 2 is a central vertical section of the refuse-soap receptacle, shown in connection with a tub and drenching-water as used.

The same letters refer to like parts in both the views.

My device is preferably constructed of sheet metal.

The refuse-soap receptacle A has tight deep upright walls, an open top, and a perforated bottom, B. The perforated bottom is preferably provided on its upper surface with upwardly-extending projections C C, which may be either conical or rib-like in form, and are for supporting the pieces of refuse soap D D and holding them a little above the bottom, so that there will be a passage-way for water thrown onto the pieces of soap to pass beneath them and out through the perforations of the bottom without their clogging the passage-ways of the water. The lower part of this receptacle A is provided with a liquid-holding cap or real bottom, E, into which it enters slightly and rests on its top at the shoulder F, which shoulder may be constructed in the form shown in Fig. 1, or as a rib or collar thereabout. This cap E is secured removably to the receptacle A by means of one or more knobs, G, rigid on the receptacle A, and adapted to enter right-angled recesses therefor in the sides of the cap E, as shown in Fig. 1, or it may be secured thereto by a screw-thread or any other well-known means for such purpose. The receptacle A is also provided with a handle, H, at its top, which handle is in the form of a hook, and is adapted for holding the receptacle by the hand or for supporting the receptacle on the side of a tub, as shown in Fig. 2. A smaller receptacle, I, having vertical or nearly vertical side walls and a perforated bottom, is fitted into the top of the receptacle A, and is provided at its top with an outwardly-projecting flange adapted to rest upon the top of the receptacle A, whereby the receptacle I is supported removably in position in the top of the receptacle A. This receptacle I is adapted to serve as a cover for the receptacle A, and also as a receptacle for a bar or cake of soap, K, for convenient and ordinary use. The top of this receptacle I is open, and it is also provided with a handle, L, of similar form to the handle H. This device, when complete, as shown in Fig. 1, is adapted to stand on the sink or on a shelf in the kitchen or laundry, and the cake of soap K in the receptacle I is ready and convenient for use, and any water or fluid dripping therefrom will pass down through the receptacle A into the cap E, where it will be retained. When any small pieces of soap or refuse soap are to be disposed of, the receptacle I is to lifted out of the receptacle A, and these refuse pieces are thrown into the receptacle A, as shown at D, when the receptacle I may be replaced in position. The cap E can be removed from time to time, as is necessary, to empty the water or fluid refuse therefrom. When a suds is required for laundry or kitchen purposes, the receptacle I and cap E are removed from the receptacle A, and the receptacle A is hung under a faucet or is held by the hand and water is thrown or allowed to run into the receptacle A upon the refuse soap, passing out through the perforated bottom, as shown in Fig. 2.

As will be seen, this device is a very convenient receptacle for small pieces of refuse soap, whereby as they are produced from time to time they may be preserved against waste, and whereby they may be conveniently used for laundry or kitchen purposes in the manner described, the walls of the receptacle being quite deep in order to allow considerable supply of water to be thrown into it at once, and at the same time to retain the water against spattering or spraying over the top of it.

The device may be round or square.

What I claim as new, and desire to secure by Letters Patent, is—

A soap-receptacle consisting of the receptacle A, having a handle, H, and a perforated false bottom, B, and the thereto removably-secured tight cup-bottom E, in combination with the receptacle I, provided with a handle and a perforated bottom and adapted to fit into the top of the receptacle A, and to serve both as a receptacle and as a cover for the receptacle A, substantially as described.

In testimony whereof I affix my signature in presence of two witnesses.

KATIE HUBER.

Witnesses:
 C. T. BENEDICT,
 JAS. B. ERWIN.